US011861341B2

(12) United States Patent
Wang et al.

(10) Patent No.: US 11,861,341 B2
(45) Date of Patent: Jan. 2, 2024

(54) NODE SELECTION METHOD AND APPARATUS

(71) Applicant: HUAWEI TECHNOLOGIES CO., LTD., Guangdong (CN)

(72) Inventors: Yawei Wang, Shanghai (CN); Yuanfeng Chen, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 115 days.

(21) Appl. No.: 17/526,402

(22) Filed: Nov. 15, 2021

(65) Prior Publication Data
US 2022/0075610 A1    Mar. 10, 2022

Related U.S. Application Data

(63) Continuation of application No. PCT/CN2020/083626, filed on Apr. 8, 2020.

(30) Foreign Application Priority Data

May 16, 2019    (CN) .......................... 201910407397.9

(51) Int. Cl.
G06F 8/61         (2018.01)
G06F 8/71         (2018.01)
H04L 41/08        (2022.01)

(52) U.S. Cl.
CPC ................. *G06F 8/63* (2013.01); *G06F 8/71* (2013.01); *H04L 41/08* (2013.01)

(58) Field of Classification Search
CPC ............. G06F 8/63; G06F 8/71; H04L 41/08
See application file for complete search history.

(56) References Cited

U.S. PATENT DOCUMENTS 9,766,900 B2 *    9/2017   Gundam ............... G06F 21/629
10,225,137 B2 *   3/2019   Jain ......................... H04L 49/70
(Continued)

FOREIGN PATENT DOCUMENTS

CN      103475638 A     12/2013
CN      104902019 A     9/2015
(Continued)

OTHER PUBLICATIONS

Chase et al., "Dynamic Virtual Clusters in a Grid Site Manager", 2003, IEEE (Year: 2003).*

(Continued)

*Primary Examiner* — Wei Y Zhen
*Assistant Examiner* — Junchun Wu
(74) *Attorney, Agent, or Firm* — WOMBLE BOND DICKINSON (US) LLP

(57) ABSTRACT

A node selection method and apparatus are disclosed. The method includes: receiving a request message, where the request message is used to request to provide an installation package of a product required by a user; searching, based on the product information in the request message, a node state table for a target node corresponding to the product information, where the node state table includes at least one correspondence; and sending the request message to the target node, so that the target node builds the corresponding product installation package for the product required by the user (203). The method can quickly find the target node that can provide a service, to complete job dispatching, and improve job dispatching efficiency.

15 Claims, 7 Drawing Sheets

(56) References Cited

U.S. PATENT DOCUMENTS

| | | | |
|---|---|---|---|
| 10,419,465 B2* | 9/2019 | Muddu | G06F 40/134 |
| 11,093,849 B2* | 8/2021 | McFall | G06F 40/123 |
| 2010/0242034 A1 | 9/2010 | Rugh et al. | |
| 2011/0055153 A1* | 3/2011 | Hashimoto | G06F 8/71 |
| | | | 707/622 |
| 2015/0363181 A1* | 12/2015 | Alberti | G06F 9/45504 |
| | | | 717/177 |
| 2017/0060550 A1* | 3/2017 | Fulton | H05K 999/99 |
| 2017/0060570 A1* | 3/2017 | Miller | G06F 8/71 |
| 2017/0085488 A1* | 3/2017 | Bhattacharya | H04L 41/122 |
| 2018/0227201 A1* | 8/2018 | Krauss | H04L 43/50 |
| 2019/0196804 A1* | 6/2019 | Li | G06F 9/45558 |
| 2019/0227621 A1* | 7/2019 | Washio | G06F 1/3287 |
| 2019/0238634 A1* | 8/2019 | Mohanta | H04L 43/20 |

FOREIGN PATENT DOCUMENTS

| | | | | |
|---|---|---|---|---|
| CN | 106375382 A | | 2/2017 | |
| CN | 106610870 A | | 5/2017 | |
| CN | 106997297 A | | 8/2017 | |
| CN | 107040513 A | * 8/2017 | | H04L 63/0442 |
| CN | 107766052 A | | 3/2018 | |
| CN | 104156225 B | * 7/2018 | | G06F 8/60 |
| CN | 109299194 A | | 2/2019 | |
| CN | 109344572 A | | 2/2019 | |
| CN | 109542611 A | | 3/2019 | |
| CN | 109710402 A | | 5/2019 | |
| CN | 110187912 A | | 8/2019 | |
| CN | 109302522 B | * 9/2020 | | H04M 1/24 |
| CN | 108196878 B | * 12/2020 | | G06F 8/41 |
| CN | 107872806 B | * 7/2021 | | H04L 41/0816 |
| JP | 4907610 B2 | * 4/2012 | | G06F 8/71 |

OTHER PUBLICATIONS

Chen et al., "Grid-based Approach for Working Node Selection in Wireless Sensor Networks", 2004, IEEE (Year: 2004).*

Sun et al., "Node selection optimization for collaborative beamforming in wireless sensor networks", 2015, Elsevier B.V. (Year: 2015).*

Hong et al., "Scalable Routing Protocols for Mobile Ad Hoc Networks", 2002, IEEE (Year: 2002).*

* cited by examiner

NODE SELECTION METHOD AND APPARATUS

CROSS REFERENCE TO RELATED APPLICATIONS

This application is a continuation of International Application No. PCT/CN2020/083626, filed on Apr. 8, 2020, which claims priority to Chinese Patent Application No. 201910407397.9, filed on May 16, 2019. The disclosures of the aforementioned applications are hereby incorporated by reference in their entireties.

TECHNICAL FIELD

This application relates to the field of software development, and in particular, provides a node selection method in a software build and development process, to quickly find a node serving a request message in a resource pool including a plurality of environments, and improve job dispatching efficiency.

BACKGROUND

Currently, with the development of cloud technologies and the popularity of mobile applications, development & operations (DevOps) has gradually replaced agile development as a real-time software development procedure. DevOps can be a collective name of a group of processes, methods, and systems for facilitating communication, collaboration, and integration between a development (applications/software engineering) department, a technical operations department, and a quality assurance (QA) department, so as to implement timely software product delivery and service providing. In addition, some software companies such as Cloud Build of Microsoft and Google and Code Build of Amazon actively promote DevOps. In a process of performing software development by using DevOps, a build task is important, and the build task includes that a system builds a specific environment according to a user requirement or a developer requirement, for example, a software development kit, a programming language and type, and a dependency, so as to configure a specific resource in the specific environment. The resource may have functions such as processing, calculation, and storage, and these functions may be implemented through pre-configuration. For ease of representation, the resource is also referred to as a node, and the node is configured to serve a request message in a specific environment, and execute a pipeline of a related product requested by a user to develop, to obtain an installation package of the product.

In a cloud platform system, all resources in all specific environments form a resource pool. The resource pool includes a plurality of nodes, and these nodes may serve a plurality of specific environments. For example, in the resource pool, some nodes specialize in providing a build service for an environment 1 of a product A, some nodes specialize in providing a build service for an environment 2 of the product A, and some nodes specialize in providing a build service for an environment 3 of the product A. Each node serves only one specific environment, and a quantity of nodes serving the specific environment is limited. In this case, when the cloud platform system receives massive request messages at a moment, and the request messages usually require relatively different specific environments, nodes selected to provide services in the resource pool are different, and even a node found in the cloud platform cannot immediately provide a service because the node is in a busy state or an offline state. Therefore, in the massive requests, how to quickly and efficiently find a node corresponding to each request message to provide a build service in time for a specific environment required by each request message is a technical problem that needs to be urgently resolved by a person skilled in the art.

SUMMARY

Embodiments of the present application provide a node selection method and apparatus, to improve efficiency of searching a resource pool for a node corresponding to a request message.

According to a first aspect, an embodiment of this application provides a node selection method. The method includes: receiving a request message, where the request message is used to request to provide an installation package of a product required by a user, and the request message carries product information that uniquely identifies the product required by the user; searching, based on the product information in the request message, a node state table for a target node corresponding to the product information, where the node state table includes at least one correspondence, each correspondence is a relationship between one node and one piece of product information, and a state of each node in the node state table is idle; and sending the request message to the target node, so that the target node builds the corresponding product installation package for the product required by the user.

According to the method provided in this aspect, the target node corresponding to the product information can be quickly found based on the product information in the request message and the correspondence included in the node state table, and the target node is idle. In this way, after the request message is sent to the target node, the target node can quickly and effectively execute a product build task in the request message, and build the product installation package. Therefore, the method improves efficiency of searching for the target node in a resource pool.

In an embodiment, the product information includes a product name and a version number corresponding to the product name; and the searching, based on the product information in the request message, a node state table for a target node corresponding to the product information includes: searching the node state table for product information with the same product name and the same version number, and using the product information as target product information; and determining the target node based on the target product information and a correspondence of the target product information.

In an embodiment, before the receiving a request message, the method further includes: receiving a configuration parameter entered by the user, where the configuration parameter is used to configure at least one build environment required when the user expects to build a product; generating at least one piece of build environment code based on the configuration parameter, and running each piece of build environment code to obtain an image file corresponding to the piece of build environment code; generating at least one node based on the image file, where one node serves a build environment corresponding to one image file, and generating a unique product name and a unique version number in the build environment; establishing the at least one correspondence based on each node, and a unique product name and a unique version number generated by the node in the build environment; and generating the node state table based on the at least one correspondence and the state of each node.

In an embodiment, a first node is configured to build an installation package of a first product in a first environment, and the target node is one of first nodes; and after the sending the request message to the target node, the method further includes: marking a state of the target node as "busy" in the node state table; detecting whether a quantity of idle-state first nodes in the node state table is less than a first threshold; and if the quantity of idle-state first nodes in the node state table is less than the first threshold, configuring and increasing the quantity of first nodes, so that an increased quantity of first nodes is not less than the first threshold.

In addition, the method further includes: when the target node completes a build task for the request message, marking the state of the target node as "idle", and updating the node state table; and if the quantity of idle-state first nodes in the node state table exceeds a second threshold, decreasing the quantity of first nodes, so that a decreased quantity of first nodes does not exceed the second threshold.

In an embodiment, when a quantity of received request messages is N, where N is a quantity of request messages obtained within preset time, N≥2, and N is a positive integer, the searching a node state table for a target node corresponding to the product information includes: searching the node state table for a target node corresponding to product information carried in each request message, to obtain N target nodes; and the sending the request message to the target node includes: sending the N request messages to the N corresponding target nodes.

According to a second aspect, an embodiment of this application further provides a node state configuration method. A container editor detects a state of each node in a resource pool, where the state includes online and offline; and when a node in an offline state is detected, marks the node, so that a server deletes the node from a node state table.

According to a third aspect, an embodiment of this application further provides a build infrastructure code (BIC) generation method. A server obtains an external environment parameter. The external environment parameter includes a programming language type and version, a software development kit (SDK) and version, and a product source code repository. The server generates BIC based on the external environment parameter, and stores the BIC in a BIC code repository.

In an embodiment, the programming language type and version include programming language runtime.

The BIC includes product pipeline code and running environment code. Further, the server executes the running environment code in the BIC to obtain an image file in a running environment. The image file is used to generate one or more nodes. When executing the product pipeline code in the BIC, the server needs to first obtain source code corresponding to a product, and generate a binary package of the product after executing the product pipeline code based on the source code corresponding to the product. The binary package may include a binary product installation package or a binary application package.

According to a fourth aspect, an embodiment of this application further provides a node determining apparatus. The apparatus includes units configured to perform the method operations in the first aspect and the implementations of the first aspect. Specifically, the apparatus includes an obtaining unit and a processing unit, and may further include another module or unit such as a storage module.

According to a fifth aspect, an embodiment of this application further provides a communications device, including a processor and a memory. The processor is coupled to the memory. The memory is configured to store instructions. The processor is configured to invoke the instructions, so that the communications device performs the node selection method in the first aspect and the implementations of the first aspect.

In an embodiment, the communications device is a server.

In addition, the communications device is further configured to implement the methods according to the second aspect and the third aspect.

According to a sixth aspect, an embodiment of this application further provides a computer-readable storage medium. The storage medium stores instructions. When the instructions are run on a computer or a processor, the method in the first aspect or the implementations of the first aspect is performed.

In addition, when the instructions are run on a computer or a processor, the method according to the second aspect or the third aspect is performed.

According to a seventh aspect, an embodiment of this application further provides a computer program product. The computer program product includes computer instructions. When the instructions are executed by a computer or a processor, the method in the first aspect and the implementations of the first aspect may be implemented; or the method according to the second aspect or the third aspect may be further implemented.

According to the method provided in this application, the target node corresponding to the product information can be quickly found based on the product information in the request message and the correspondence included in the node state table, and the target node is idle. In this way, after the request message is sent to the target node, the target node can quickly and effectively execute the product build task in the request message, and build the product installation package. Therefore, the method improves efficiency of searching for the target node in the resource pool.

DESCRIPTION OF EMBODIMENTS

Figure 1:
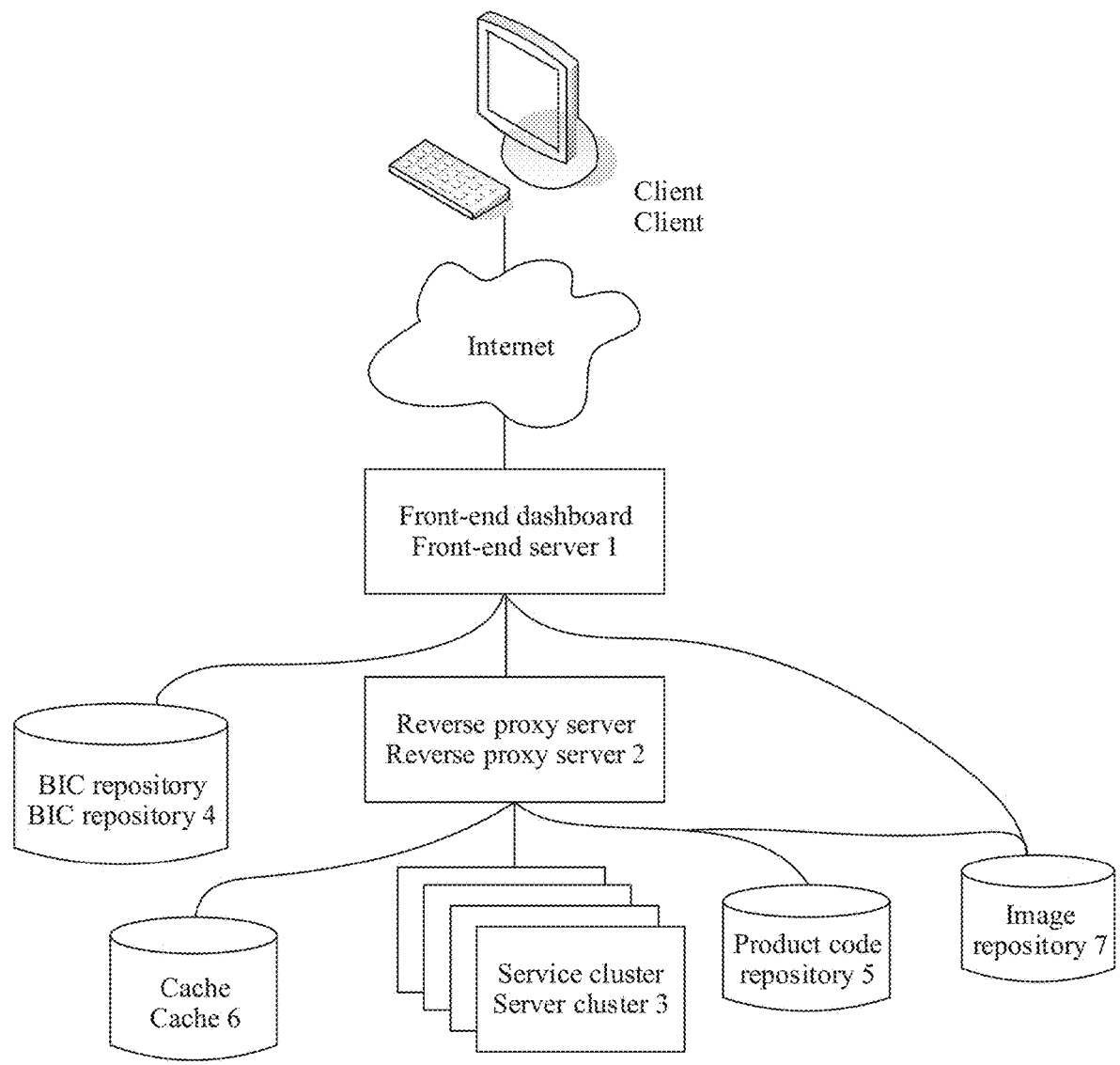
FIG. 1 is a schematic diagram of a structure of an IBI system according to an embodiment of this application.

To make a person skilled in the art understand the technical solutions in the embodiments of this application better, and make the objectives, features, and advantages of the embodiments of this application clearer, the following further describes the technical solutions in the embodiments of this application in detail with reference to the accompanying drawings.

First, names and concepts in the embodiments of this application are described.

(1) Immutable Build Infrastructure (IBI)

An immutable build infrastructure IBI may also be referred to as a standard build infrastructure. Specifically, the IBI may be a standard build system. The system is configured to perform an entire software development process, namely, implement a process from development of source code to generation of a binary product installation package. For example, the process includes: environment building, generating an image file in the build environment, deploying a node based on the image file, and receiving and executing a build task by the node. In this process, each phase in the IBI cannot be changed, and can be modified only by application through an external port and therefore cannot be changed in an IBI-based system. This ensures security and stability when the IBI is used for DevOps.

(2) Build Infrastructure Code (BIC)

BIC is build infrastructure code, and the BIC may include two parts of code: one part is product pipeline code, and the other part is running environment code. The running environment code in the BIC is executed to obtain an image file in the running environment. The image file is used to generate one or more nodes. When the product pipeline code in the BIC is executed, source code corresponding to a product needs to be obtained, so as to obtain a binary package of the product, for example, a binary product installation package or a binary application package.

The running environment code provides a related parameter and information for executing the product pipeline code.

Further, various software development kit (SDK) libraries and third-party dependencies are described in the product pipeline code. The running environment code describes a programming language and a running environment (runtime), data package management, project management, a compilation tool, and all configuration parameters.

(3) Domain-Specific Language (DSL)

A DSL is a computer language used to write an application, for example, a C language or a Java language. In the embodiments of this application, the DSL specifically refers to a computer language used to write build infrastructure code BIC.

Second, an application scenario of the technical solutions of this application is described.

The technical solutions of this application may be applied to an IBI system, use the IBI system to build a plurality of secure, stable, and compliant environments, and can provide build services based on requirements of different products in the environments. This can quickly and effectively find target nodes corresponding to each request message, to improve job dispatching efficiency.

The technical solutions may be applied to all environment-as-code and dynamic job dispatching scenarios, such as a development environment, a test environment, and a running environment. In addition, the technical solutions can also be applied to any application scenario requiring dual delivery, for example, a service scenario of an e-commerce application. When delivering an application to a customer, the IBI system or a cloud platform system also delivers a DevOps environment on all cloud platforms, to meet market requirements of improving software development efficiency and quickly responding in a unified DevOps environment.

FIG. 1 is a schematic diagram of a structure of an IBI system according to an embodiment of this application. The IBI system includes at least one client, a front-end dashboard 1, a reverse proxy server 2, a service cluster 3, a BIC repository 4, a product code repository 5, a cache 6, and an image repository 7.

Specifically, the client may be a terminal device, and is a device that provides a service and/or data connectivity for a user, a handheld device with a wireless connection function, or another processing device connected to a wireless modem, for example, a wireless terminal.

Further, the wireless terminal may communicate with one or more nodes over a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or vehicle-mounted mobile apparatus, which exchanges a language and/or data with the radio access network. For example, the wireless terminal may be a device such as a personal communications service (PCS) phone, a cordless telephone set, a session initiation protocol (SIP) phone, a wireless local loop (WLL) station, or a personal digital assistant (PDA). The wireless terminal may also be a subscriber unit, a subscriber station, a mobile station, a mobile terminal, a remote station, an access point (AP), a remote terminal, an access terminal, a user terminal, a user agent, a user device, or user equipment (UE). A specific technology and a specific device form used by a terminal device are not limited in the embodiments of this application.

The front-end dashboard (e.g., front-end server) 1 or a dashboard for short is configured to receive a configuration parameter entered by at least one client. The configuration parameter is used to configure a build environment required by a user, generate BIC, and start a build job procedure based on the BIC. Further, the configuration parameter includes but is not limited to a node resource, an operating system, programming language runtime, a compiler and configuration, a third-party dependency, and the like. Further, the node resource includes, for example, a quad-core CPU and a 16 GB memory. The operating system includes, for example, Ubuntu (Linux) and an IOS system. The programming language runtime includes, for example, JVM (Java). The third-party dependency may be depending on a component module of a product open source, or the like.

The reverse proxy server 2 is configured to: after various build environments required by the user are configured in the dashboard, and a resource pool is built, when at least one node in different build environments is deployed in the resource pool, receive a request message; search the resource pool for a target node based on the request message; and deliver the request message to the target node, so that the target node can complete a build task of a product installation package based on content of the request message.

The service cluster 3 may be a resource pool including at least one node, and is configured to: receive the request message from the reverse proxy server, and execute the pre-generated BIC, namely, execute product pipeline code (a part of code in the BIC) in a specific running environment, to obtain the corresponding product installation package, and complete the build task.

The node includes but is not limited to a processor, a chip unit, a logic circuit, and the like.

In an embodiment, the service cluster 3 further includes a container orchestrator (or referred to as an infrastructure server), and is configured to set and record a state of each node in the service cluster. The state of each node includes an online state and an offline state.

In addition, the front-end dashboard 1 and the reverse proxy server 2 may be integrated into one device, for example, a server; or may be separately deployed. This is not specifically limited in this embodiment.

The BIC repository 4 is configured to store the BIC generated by the front-end dashboard 1 for invoking by the service cluster 3.

The product code repository 5 is configured to store product source code. When the selected target node performs a build job, the target node obtains the product source code from the product code repository 5, executes the product pipeline code in the predefined BIC, and finally obtains the binary product installation package.

The cache 6 may be configured to store a "node state table". The node state table includes at least one correspondence. Each correspondence is a relationship between one node and one piece of product information. The product information includes a product name and a version number, for example, a node 1, a product A, and a version number 0.0.1. In addition, each correspondence further includes a state of the node, and the state includes an idle state and a busy state. Further, the idle state may be represented by "1", and the busy state may be represented by "0". In addition, each correspondence may further include more information, for example, an IP address of each node, and a port number of each node.

For example, a correspondence between a node and product information is: a node 1, a product A-0.1.1-192.168.0.12-2315, 0. It can be interpreted as that an IP address of the node 1 is 192.168.0.12 and a port number of the node 1 is 2315. The node 1 can be used to execute a build task of the product A whose version number is 0.1.1 in a specific environment, so as to obtain an installation package of the product A whose version number is 0.1.1. A current state of the node 1 is idle, and can execute the build task immediately after a request message is received.

The image repository 7 is configured to store an image file of each node, and the image file is used to deploy and generate each node. Further, the image file is generated by the reverse proxy server 2 when the BIC is executed. In addition, the image file can be copied. Therefore, the image file may be copied to generate or deploy a plurality of nodes. These nodes can be used to build installation packages of same products in a same environment.

The following describes methods provided in the embodiments of this application.

Figure 2:
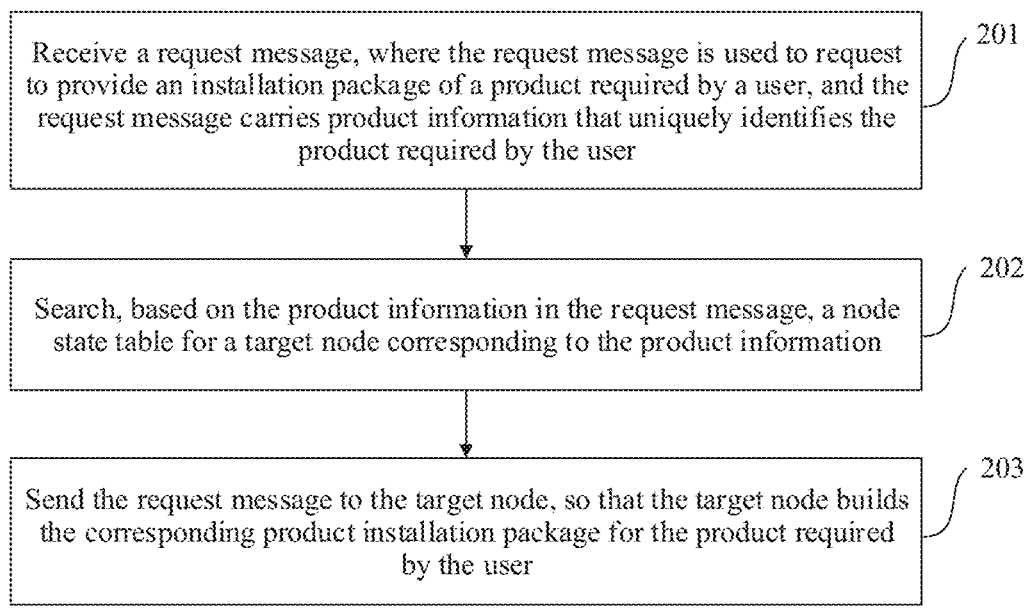
FIG. 2 is a flowchart of a node selection method according to an embodiment of this application.

An embodiment provides a node selection method. The method may be performed by a server or a processor in an IBI system, and the server or the processor has functions of the foregoing dashboard and the reverse proxy server. Further, as shown in FIG. 2, the method includes the following operations.

Operation 201: Receive a request message, where the request message is used to request to provide an installation package of a product required by a user, and the request message carries product information that uniquely identifies the product required by the user.

The product information includes a product name and a version number corresponding to the product name, and may further include a product type and the like. In addition, the request message may be from an external system or a client.

Operation 202: Search, based on the product information in the request message, a node state table for a target node corresponding to the product information, where the node state table includes at least one correspondence, each correspondence is a relationship between one node and one piece of product information, and a state of each node in the node state table is idle.

In an embodiment, operation 202 includes: The server searches the node state table for product information with the same product name and the same version number, and uses the product information as target product information. Then the server determines the target node based on the target product information and a correspondence of the target product information. The node state table is used to reflect conditions of each node in a current service cluster resource pool, including a node number, a name (or a type) of a product that can be built by each node, a version number, a node IP address, a node state, and the like.

For example, a current request message includes a product name such as WeChat and a corresponding version number 10.0.1. If the server selects three nodes that can provide a build service for the request message of WeChat from the node state table, the server sequentially selects a first node as a target node.

Operation 203: Send the request message to the target node, so that the target node builds the corresponding product installation package for the product required by the user.

In an embodiment, after receiving the request message, the target node executes pre-generated BIC code based on the product name and the version number that are carried in the request message, to obtain the corresponding product installation package. The pre-generated BIC code is used to provide a basis for generating a product installation package in a specific environment.

In addition, a process of generating BIC code is performed before operation 201. The server receives a configuration parameter entered by the user, where the configuration parameter is used to configure at least one build environment required when the user expects to build a product; and generates at least one piece of build environment code BIC based on the configuration parameter, and runs each piece of BIC to obtain an image file corresponding to the piece of BIC. Then the server generates at least one node based on the image file, where one node serves a build environment corresponding to one image file, and generates a unique product name and a unique version number in the build environment; establishes the at least one correspondence based on each node, and a unique product name and a unique version number generated by the node in the build environment; and finally generates the node state table based on the at least one correspondence and the state of each node.

In an embodiment, BIC is generated based on a configuration parameter, the BIC is executed to generate a plurality of image files, and a plurality of nodes are deployed based on the image files, to form a service cluster resource pool for executing a build job to complete product installation package build. Because each node can execute a build job for a build environment, conditions of all nodes are integrated into a node state table of the resource pool to prepare for quick target node searching subsequently.

In an embodiment, the target node corresponding to the product information can be quickly found based on the product information in the request message and the correspondence included in the node state table, and the target node is idle. In this way, after the request message is sent to the target node, the target node can quickly and effectively execute the product build job in the request message, and build the product installation package. Therefore, the method improves efficiency of searching for the target node in the resource pool.

In addition, the state of each node is dynamically updated in the node state table. Data on a type of nodes is increased or decreased to ensure that a specific quantity of nodes are available in the cluster and can provide services for this type of product at any time.

In an embodiment, for example, the service cluster has a plurality of first nodes, the first node is configured to build an installation package of a first product in a first environment, and the target node is one of the plurality of the first nodes. After operation 203 is performed. The server marks a state of the target node as "busy" in the node state table; detects whether a quantity of idle-state first nodes in the node state table is less than a first threshold; and if the quantity of idle-state first nodes in the node state table is less than the first threshold, configures and increases the quantity of first nodes, so that an increased quantity of first nodes is not less than the first threshold. The first threshold may be determined based on a speed at which the server starts and establishes the first node. Because it takes relatively long time to build one node based on an image file, the quantity of first nodes is pre-deployed and controlled, so that when a request message is received again, a target node can be quickly found to provide a service.

Likewise, when the target node executes the build task in the request message, the server marks the state of the target node as "idle", and updates the node state table. If the quantity of idle-state first nodes in the node state table exceeds a second threshold, the server decreases the quantity of first nodes, so that a decreased quantity of first nodes does not exceed the second threshold.

Figure 3:
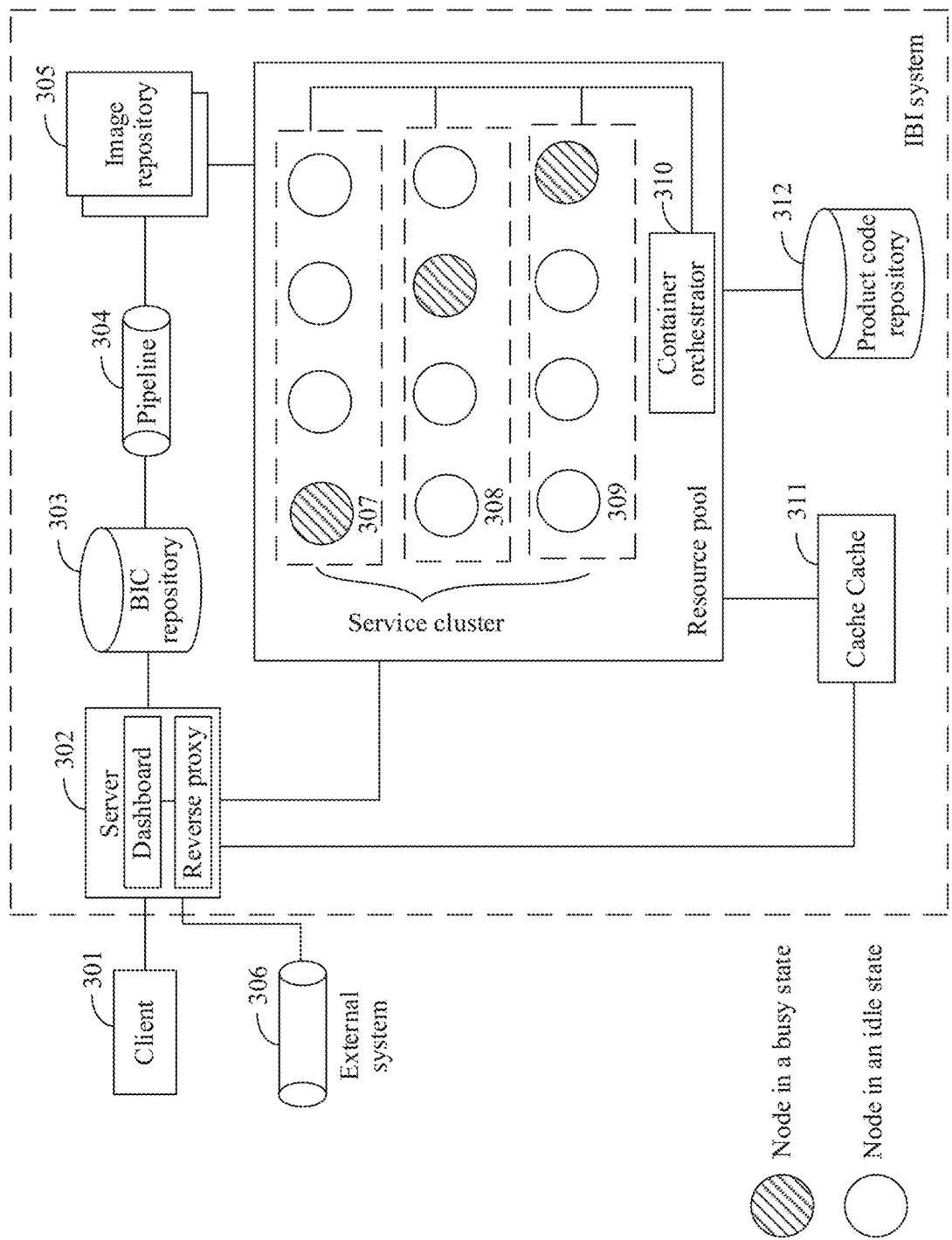
FIG. 3 is a schematic diagram of a structure of another IBI system architecture according to an embodiment of this application.

In an embodiment of this application, FIG. 3 is a schematic diagram of a structure of another IBI system architecture. The diagram is extension based on the system in FIG. 1. In an embodiment, the system includes a server 302, a BIC repository 303, a pipeline 304, an image repository 305, a service cluster (node 307/308/309), a container orchestrator 310, a cache 311, a product code repository 312, and the like. In addition, at least one client 301 and an external system 306 are further included outside the system. The server 302 includes a dashboard and a reverse proxy server.

Figure 4:
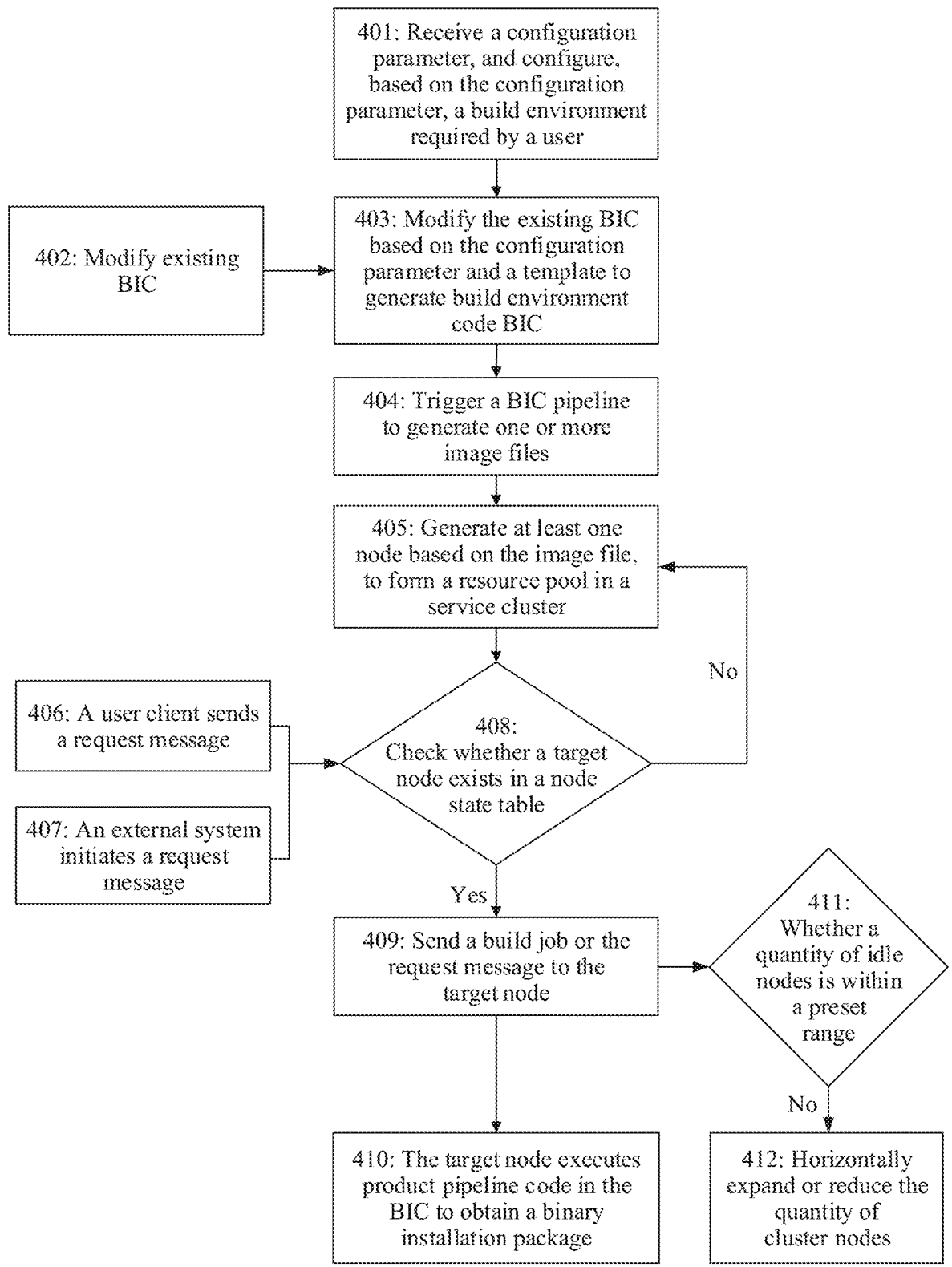
FIG. 4 is a flowchart of another node selection method according to an embodiment of this application.

The system is configured to execute a method procedure shown in FIG. 4, to quickly and efficiently search for a node in a specific environment. In an embodiment, as shown in FIG. 4, the method includes two parts of procedures. A first part of the procedure is from operation 401 to operation 405 and is mainly that the server performs functions of environment configuration, BIC generation, and node deployment. A second part of the procedure is from operation 406 to operation 412 and is mainly that the server performs a function of determining a target node, and dispatching a request message to the target node, and the target node completes a build task based on the request message.

In an embodiment, the first part of the procedure includes the following operations.

Operation 401: The server 302 receives a configuration parameter entered by a user, and configures, based on the configuration parameter, a build environment required by the user. Further, the configuration parameter includes but is not limited to a node resource, an operating system, programming language runtime, a compiler and configuration, a third-party dependency, and the like.

In an embodiment, software development, test, and operation and maintenance personnel enter the configuration parameter by using the dashboard in the server.

Operation 402 and operation 403: The server 302 modifies existing BIC based on the configuration parameter and a template to generate build environment code BIC. If a plurality of pieces of BIC are generated, each piece of BIC includes "product pipeline code" and "running environment code".

In an embodiment, the server 302 stores one or more pieces of BIC in the BIC repository 303.

For example, in this embodiment, if the plurality of pieces of BIC are generated, a relationship between these pieces of BIC may be as follows. A product A (prodA) generates BIC 1 in a build environment 1; the product A generates BIC 2 in a build environment 2; and the product A generates BIC 3 in a build environment 3, where the BIC 1, the BIC 2, and the BIC 3 are stored in a same BIC repository, but are stored in three branches of the same BIC repository.

Operation 404: In the process of generating the BIC in operation 403, when "modifying the existing BIC", the method further includes: The server 302 triggers a BIC pipeline (for example, obtaining a basic image, and installing various compilation tools and dependencies) to generate one or more image files. In an embodiment, the server 302 executes product pipeline code ("pipeline" for short) in the BIC 1 to generate an image file 1 corresponding to the BIC 1. Likewise, the server 302 executes a "pipeline" in the BIC 2 to generate an image file 2 corresponding to the BIC 2. The server 302 executes a "pipeline" in the BIC 3 to generate an image file 3 corresponding to the BIC 3.

In an embodiment, the image file 1, the image file 2, and the image file 3 are stored in the image repository 305.

Operation 405: The server 302 generates at least one node based on the image file (1/2/3) stored in the image repository, for example, generates a node 1, a node 2, and a node 3, to form a resource pool in a service cluster. For example, the node 1 is configured to provide a service for the product A (prodA) in the build environment 1. The node 2 is configured to provide a service for the product A (prodA) in the build environment 2. The node 3 is configured to provide a service for the product A (prodA) in the build environment 3. In addition, different types of products may be included.

The container orchestrator 310 generates a "node state table" based on a state (including three states: busy, idle, and online) of each node, and stores the "node state table" in the cache 311.

In an embodiment, a process of building the node state table includes building at least one correspondence. Each correspondence is a correspondence between a cache key and a cache value. Further, the cache key includes a product name or a product type and a version number, an IP address of a node, a port (Port) number of the node, and the like. The cache value is used to indicate anode state. The node state includes "idle" and "busy". Further, "0" indicates idle, and "1" indicates busy.

Figure 5:
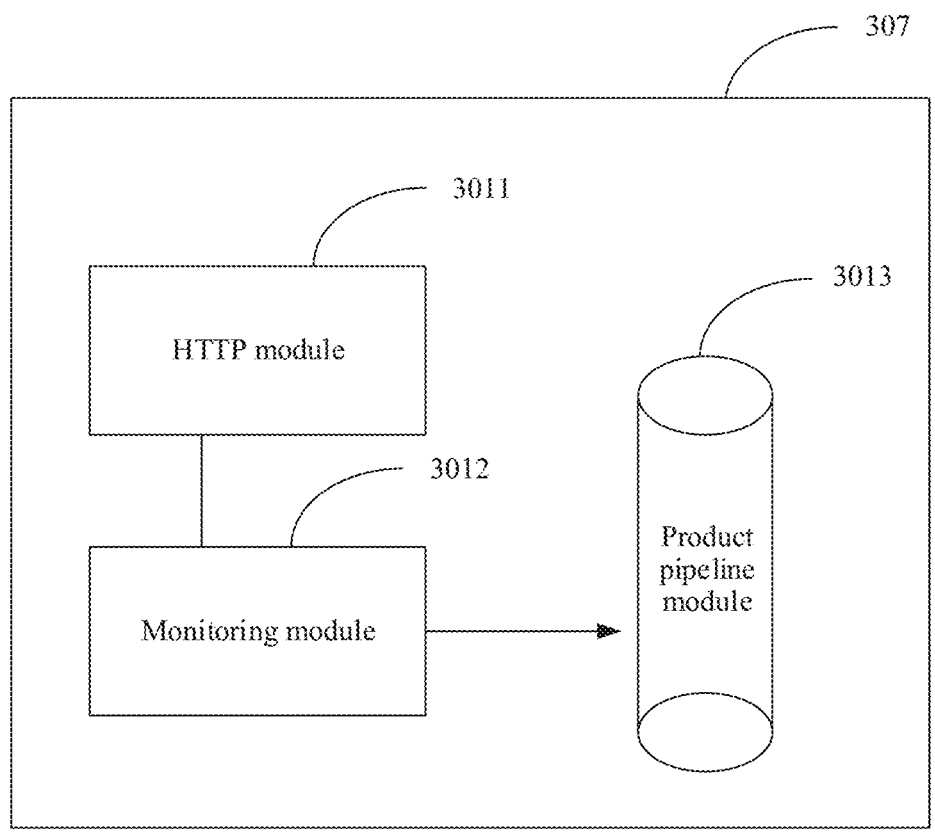
FIG. 5 is a schematic diagram of a structure of a node according to an embodiment of this application.

Further, a process of determining the cache value includes: As shown in FIG. 5, each node 307 (or 308, 309) in the service cluster includes three modules: a hypertext transfer protocol (HTTP) module 3011, a monitoring module 3012, and a product pipeline module 3013. The HTTP module 3011 is configured to receive a request message sent by the server 302, and after receiving the request message, execute, by using the product pipeline module 3013, a build job corresponding to the request message, to generate an installation package of a corresponding product. In addition, the HTTP module 3011 is further configured to convert the request message into an HTTP format. The monitoring module 3012 is configured to: monitor whether the build job is completed; and if the build job is completed, configure a state of the node as "idle", or if the build job is not complete or is being executed, configure a state of the node as "busy".

In an embodiment, the HTTP module 3011 is further configured to register the node 307 (or 308, 309). For example, after the node starts the build job, the HTTP module 3011 is used to register related information of the node with the cache 311. The related information of the node includes an IP address of the node, a port number of the node, an environment for executing the build job, a product type, a version number, and the like. For example, a registered cache entry includes a cache key and a cache value.

The cache key is product type-version number-IP address-port number.

The cache value is 0 (default).

Generally, when there is no request message allocated to the node, the HTTP module 3011 sets a cache value of the HTTP module 3011 to "0". When receiving the request message, the HTTP module 3011 sets the cache value of the HTTP module 3011 to "1". The HTTP module 3011 does not receive any new request message in a busy state until the node completes the current build task, and sets the state of the node to "0".

Table 1 shows a node state table. The node state table includes a correspondence between a node number of at least one build node, a cache key, and a cache value.

TABLE 1

| Node number | Cache key | Cache value |
|---|---|---|
| 1 | prodA-0.1.1-192.168.0.12-2315 | 0 |
| 2 | prodA-0.1.1-192.168.0.13-3467 | 1 |
| 3 | prodB-1.1.2-192.168.0.14-23215 | 1 |
| 4 | prodB-1.1.2-192.168.0.15-22347 | 0 |
| 5 | prodC-2.1-192.168.0.16-3659 | 0 |
| 6 | prodC-2.1-192.168.0.17-2459 | 1 |

In addition, it should be noted that all nodes listed in Table 1 are in an online state, namely, can provide services for a request message and build corresponding product installation packages. In an embodiment, whether each build node is in the online state may be set by the container orchestrator 310, and is reflected in the node state table. The server 302 maintains the online state of each node in the node state table. If the server 302 detects that a node is in an offline state, the server 302 deletes the node from the node state table, to prevent the node from receiving and executing a build task again.

In an embodiment, the node state table is stored in the cache 311.

The following describes structures and functions of the "product pipeline code" and the "running environment code" of the BIC generated in operation 403.

In the product pipeline code, three execution phases are included. The three execution phases are installation, build, and deployment. Product source code is obtained in the installation phase. In an embodiment, the product source code may be obtained from the product code repository 312. Test scripts are executed in the build phase. Image files are generated and a plurality of nodes are deployed in the deployment phase to form a service cluster.

When the three execution phases of the product pipeline code are executed, a parameter needs to be entered, or related information needs to be provided. The related information may be provided by the running environment code, namely, the product pipeline code is executed under a parameter condition defined by the running environment code, to obtain a node that serves a specific environment.

For example, the configuration parameter entered externally includes: language_runtime (programming language runtime), sdk_version (SDK and version), repository (product source code repository), and the like. To facilitate identification of the configuration parameter, the configuration parameter that needs to be entered may be generally marked with a symbol "$". For example, $language_runtime indicates a variable parameter of programming language runtime.

An embodiment provides an example of running environment code. The example describes a running environment (parameter) required for executing "product pipeline code", and the like.

language: $language runtime (Parameter of programming language runtime (such as Java virtual machine))

sdk:

$sdk_version (SDK and version (for example, JDK 1.7))

stages:

setup (Installation step)

build (Build step)

deploy (Deployment step)

setup:

git pull $repository (Script in installation step (indicates obtaining pull source code from a git repository)

paths:

<path of source code> (Path for storing source code)

build:

script:

<run build script in $repository> (Execute product code in a code repository to obtain a build script)

artifacts:

paths:

<path of targets> (Path for storing build result)

deploy:

script:

<path of script to deploy build artifacts> (Script used to deploy build result)

env:

language_runtime: {{"LANGUAGE_RUNTIME"} parameter} sdk_version: {{"SDK_VERSION" } parameter} repository: {{"SOURCE_CODE_REPOSITORY"} parameter}.

Two types of service objects are defined in the running environment code: builders and provisioners. A builder part includes a type of a product for executing the build job, a node access permission (such as an access key access_key and a secret key secret_key), and a resource region, for example, a node where the server is deployed is in East China and North China, an image file name (image_name), a basic image type and address (base image), an access username (ssh_username), and an instance type (instance_type). For example, an instance type 4U8G indicates a node with a quad-core CPU and an 8-GB memory. In addition, a plurality of builders can be defined. Different builders can build different types of running environments, so that different types of nodes can be integrated into a service cluster in a plurality of phases. For example, two builders can define two types of running environments and deploy a build node 1 and a build node 2 accordingly to execute build jobs in the two running environments.

A provisioner part defines one or more units by the running environment code. These units can be configured to install or configure tool software that a running environment depends on. In addition, a plurality of provisioners can be defined, such as ansible-local and shell. A variable (variables) part is used to enter an external parameter, such as an access key, an access key, or an image address. In addition, some data is required in the product pipeline code, including code and build scripts of the provisioner such as playbook_file, role_path, and script_path. Various configuration management tool components and related extension and dependencies are stored in the product code repository 312.

The following shows a piece of product pipeline code.

```
{
"variables": {(Variable definition, can be transferred from outside)
   "access_key": "{{env 'ACCESS_KEY'}}", (Access key)
   "secret_key": "{{env 'SECRET_KEY'}}", (Secret key)
   "base_image1": "{{env 'BASE_IMG1'}}", (Basic image file address 1)
   "instance_type1": "{{env 'INST_TYPE1'}}", (Image file instance type 1)
   "base_image2": "{{env 'BASE_IMG2'}}", (Basic image file address 2)
   "instance_type2": "{{env 'INST_TYPE2'}}", (Image file instance type 2)
   "playbook_file": "{{env 'ANSIBLE_PLAYBOOK'}}", (File address for ansible playbook)
   "role_path": "{{env 'ANSIBLE_ROLE'}}", (Address for ansible role)
   "script_path": "{{env 'SHELL_SCRIPT'}}" (Script address of shell script)
},
"builders": [
   {
   "type": "cloud-vm", (Basic image file type (cloud vm indicates a cloud virtual machine)
   "access_key": "{user 'access key'}}",
      "secret_key": "{{user 'secret_key'}}",
   "region": "cn", (Region (cn indicates that the cloud virtual machine is in China)
   "image_name": "build-node1", (Node name)
   "base_image": "{{user 'base image1'}}",
   "ssh_username": "root", (ssh access user name)
   "instance_type": "{{user 'instance_type1'}}"
   ..."
   "provisioners": [
   {"type": "ansible-local", (ansible-local is used as a node configuration mode)
   "playbook_file": "ansible/{{user 'playbook_file'}}",
   "role_paths": [
      "{{user 'role_path'}}"
   ]
      "type": "shell", (shell script is used as a node configuration mode)
   "script_path": "{{user 'script_path'}}"
   }
]
}.
```

In an embodiment, the server executes the "running environment code" to form an image file, and generates and deploys at least one node, to form the resource pool in the service cluster. Each node in the resource pool can execute a job task in a running environment corresponding to the node. After the node is established and deployed, when one or more nodes receive a request message or service request, the "product pipeline code" is run to generate a binary package of the corresponding product from the source code in the product code repository for subsequent installation use.

It should be noted that this embodiment merely lists the "running environment code" and the "product pipeline code" of one piece of BIC, and may further include more or less other content. This is not limited in this embodiment.

In addition, once the BIC code is generated, the BIC code cannot be modified, namely, a user or a developer is not allowed to directly modify the running environment on the node. If running environment code of a product needs to be modified, a client needs to submit a BIC modification request, and the server determines the modification request. If the modification request is approved, the request is allowed to be modified. The modification triggers the pipeline to execute the BIC to generate the image file.

According to the method disclosed in this embodiment, the server presents different environments as code by using the configuration parameter, designs and customizes an efficient extender and interpreter based on an existing DSL language, and presents the build environment (the "running environment code" and the "product pipeline code") as code in a form of the BIC. This implements beneficial effects of a replicable target build environment, a repetitive build process, and checkable and inspectable build deployment; and resolves black-box, manual, and non-repetitive issues in building the environment.

As shown in FIG. 4, the method further includes the second part of the procedure. Specifically, the following operations are included.

Operation 406: The user sends a request message to the server through the client 301. Alternatively, operation 407: The external system 306 initiates a request message to the server.

The request message is used to request to provide an installation package of a product required by the user. Further, the request message includes a product type/product name and a version number. The product type and the version number, or the product name and the version number are used to uniquely determine the product required by the user. For example, WeChat 10.0.1. In addition, a build environment required by the product name and the version number that are carried in the request message is one of pre-configured environments, namely, a build environment used to generate an installation package of the product name "WeChat" and the version number "10.0.1" has been prepared in advance in the first part of the procedure.

In an embodiment, the external system includes project management, an integrated development environment (IDE), code hosting, test, release, deployment, and the like that can be seamlessly integrated into a build request service, to implement one-stop full-technology stack software research & development services covering a full-lifecycle.

Operation 408: The server 302 receives the request message from the client 301 or the external system 306, and searches the "node state table" for the corresponding target node based on information carried in the request message.

Operation 409: If there is the target node, send the request message or a build job to the target node, where the build job is generated based on the request message.

If there is no the target node, go back to operation 405 to perform an operation of building an image file to generate a node.

Operation 410: After receiving the request message or the build job sent by the server, the target node executes the product pipeline code in the corresponding BIC to obtain the binary installation package. For example, if the target node is the node 1, the node 1 executes the product pipeline code of "the product A in the build environment 1" after receiving the request message or the build job, to generate an installation package of the product A.

In addition, the method further includes: The node 1 stores the installation package of the product A in a product repository.

In addition, a quantity of idle nodes in the service cluster is dynamically adjusted. Details are as follows.

Operation 411: The server 302 determines whether the quantity of current idle nodes is within a preset range. For example, when the node 1 executes the build job and changes to the busy state, the server 302 detects whether a quantity of current idle nodes 1 is within the preset range.

Operation 412: If the quantity of the current idle nodes is not within the preset range, increase or decrease the quantity of the nodes of this type, so that a quantity of nodes after the increasing or decreasing is within the preset range.

For example, when a quantity of idle nodes used to build WeChat 10.0.1 is less than a preset minimum value, a new idle node is added, so that a quantity of idle nodes after the adding reaches a minimum value in the preset range. Likewise, when the node 1 completes the build job and changes to the idle state, the quantity of the idle nodes 1 may exceed a maximum value in the preset range. Therefore, the quantity of the nodes 1 is decreased appropriately, so that the quantity of the nodes 1 is controlled within the preset range.

Likewise, the server 302 controls a quantity of nodes of each type in a range, for example, a preset range [a1, b1] for a quantity of first-type nodes (nodes 307) that execute to build the product A, a preset range [a2, b2] for a quantity of second-type nodes (nodes 308) that execute to build the product B, and a preset range [a3, b3] for a quantity of third-type nodes (nodes 309) that execute to build the product C, so that the quantity of the nodes of each type in the resource pool can be freely switched. This fully utilizes the resource pool and improves product build efficiency.

In addition, to improve efficiency of sending a request message and avoid a request message loss, this embodiment further discloses a dynamic build job dispatching method. The method may be applied to a case in which massive request messages for building a product installation package need to be sent. A feature of a cloud service is coping with an unpredictable request volume. When the massive build request messages are sent to a server within a short period of time, the massive build request messages can be dispatched in batches to improve build job dispatching efficiency and reduce the request message loss.

In an embodiment, when a quantity of received request messages by the server 302 is N, where N is a quantity of request messages obtained within preset time, N≥2, and N is a positive integer, the node state table is searched for a target node corresponding to product information carried in each request message, to obtain N target nodes. Then, the N request messages are sent to the N corresponding target nodes. The N request messages obtained within the preset time may be stored in a dispatching queue by using a cache technology (for example, a Redis cache).

For example, the server creates a first in first out queue (FIFIO) in a memory. After finding the corresponding target node based on each request message in the queue, the server sends all request messages in the queue to the corresponding target node in the service cluster, and clears the queue, so as to continue to obtain request messages in a next preset time period, search for a target node corresponding to each request, and finally dispatch all these request messages to the corresponding target node. Further, the server dispatches all the request messages in the queue within the preset time by using a configuration file. For example, a round robin load balancing algorithm is set in the configuration file. In an embodiment, it is set that a job dispatching operation is started when a quantity of obtained request messages reaches a quantity limit of messages that can be accommodated by the queue, or the request messages in the queue are dispatched according to a principle of receiving all the request messages in a preset time period.

In an embodiment, when services need to be provided for the massive build request messages instantaneously, the server further sets storage space for storing all external request messages, and then establishes a queue in these external request messages and performs job dispatching.

In addition, the server configures the round robin algorithm that is updated in real time, this can effectively improve job dispatching efficiency, and can be applied to a multi-type node-based request load balancing scenario.

The client configures and generates the BIC, stores the BIC, and reviews, modifies, and executes the BIC to generate the image file of the build environment, to present build environments of different products as code. In addition, a solution is provided to uniformly build a source code input end of the IBI system and an output end of the product installation package. This method makes it easy to deploy a secure, consistent, and compliant build environment and significantly improves a build capability. In addition, it solves problems of high complexity, deep build levels, error-prone delivery, and a low build resource reuse rate and low build resource utilization of complex products in a large-scale build process.

Figure 6:
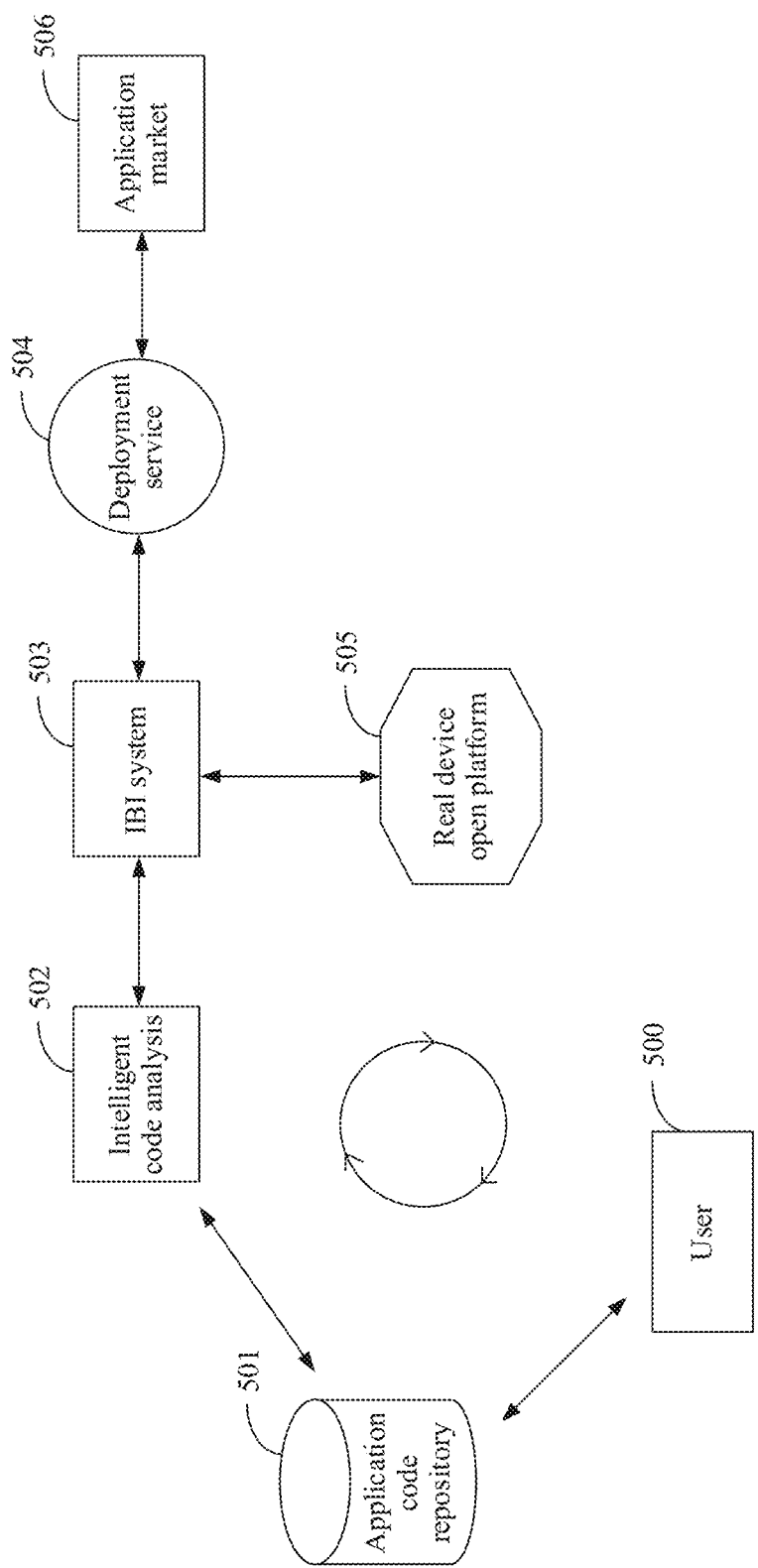
FIG. 6 is a schematic diagram of a structure of an intelligent application verification platform according to an embodiment of this application.

In specific application, the method provided in this embodiment may be applied to an intelligent application verification platform in FIG. 6. In an embodiment, the platform includes: a user 500, an application code repository 501, an intelligent code analysis apparatus 502, an IBI system 503 (as shown in FIG. 3), a deployment service 504, a real device open platform 505, and an application market 506. Further, the user 500 obtains application code (a product or source code) of a product from the application code repository 501, and sends the application code to the intelligent code analysis apparatus 502 in the intelligent application verification DevOps platform. The intelligent code analysis apparatus 502 analyzes security, compatibility, stability, and the like of the application code. The IBI system 503 provides a secure, consistent, and compliant build environment based on a type of the product corresponding to the application code, generates a product installation package or an application package (APK), and finally sends the product installation package or the application package to the real device open platform 505 for real device testing and verification. After the verification is passed, the product installation package or the application package is released in the application market 506.

This technical solution works with the intelligent application verification platform (such as Android Green Alliance or a HiAi platform) to provide a unified DevOps environment for application building, testing, and verification. It aims to optimize a current test and verification process, perform intelligent analysis and detection from application source code based on an intelligent code service, build and generate the product installation package or the application program package by using a standard build platform, and then deploy the product installation package or the application program package to the real device open platform of a terminal for automatic real device testing. If the intelligent analysis, build, and real device test and verification are all passed, the package is released to the application market (or released by a user). This method increases application code-level quality assurance, ensures a basic quality standard of the real device verification process, and improves test efficiency and test platform productivity.

In addition, many mobile game and application development companies do not want to open product code to the public, even in a closed continuous delivery environment. However, the companies hope that the same intelligent application verification platform (as shown in FIG. 6) can be used to manage a development procedure. This ensures that a finally released game or product installation package can successfully pass verification. The technical solution in this embodiment can facilitate delivery and deployment of an entire set of the intelligent application verification DevOps platform to a user data center (the user pays for use), ensure security, compatibility, and stability of the code corresponding to the user in a development process, and meet a requirement of the user.

The following describes apparatus embodiments corresponding to the foregoing method embodiments.

Figure 7:
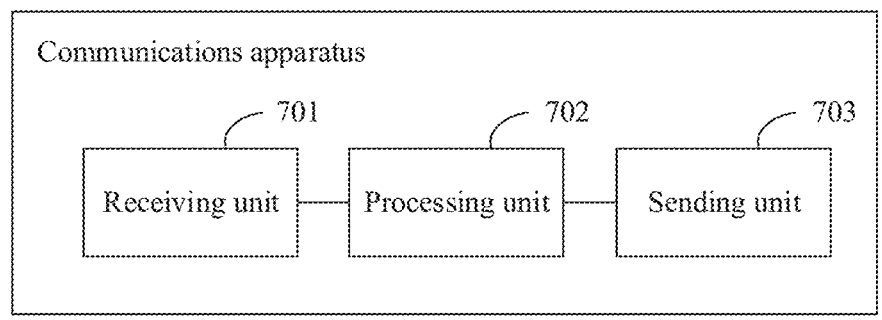
FIG. 7 is a schematic diagram of a structure of a node selection apparatus according to an embodiment of this application.

FIG. 7 is a schematic diagram of a structure of a communications apparatus according to an embodiment of this application. The apparatus may be the server in the foregoing method embodiments, or may be a network device, or a communications device, or may be a component located in a network device, for example, a chip. Further, the apparatus may implement all functions of the server in the foregoing embodiments.

Further, as shown in FIG. 7, the apparatus may include a receiving unit 701, a processing unit 702, and a sending unit 703. In addition, the apparatus may further include a storage unit or another unit or module.

The receiving unit 701 is configured to receive a request message. The request message is used to request to provide an installation package of a product required by a user, and the request message carries product information that uniquely identifies the product required by the user. The processing unit 702 is configured to search, based on the product information in the request message, a node state table for a target node corresponding to the product information. The node state table includes at least one correspondence. Each correspondence is a relationship between one node and one piece of product information. A state of each node in the node state table is idle. The sending unit 703 is configured to send the request message to the target node, so that the target node builds the corresponding product installation package for the product required by the user.

In an embodiment, the product information includes a product name and a version number corresponding to the product name. The processing unit 702 is configured to: search the node state table for product information with the same product name and the same version number, and use the product information as target product information; and determine the target node based on the target product information and a correspondence of the target product information.

In an embodiment, the receiving unit 701 is further configured to: before receiving the request message, receive a configuration parameter entered by the user. The configuration parameter is used to configure at least one build environment required when the user expects to build a product. The processing unit 702 is further configured to: generate at least one piece of build environment code based on the configuration parameter, and run each piece of build environment code to obtain an image file corresponding to the piece of build environment code; generate at least one node based on the image file, where one node serves a build environment corresponding to one image file, and generate a unique product name and a unique version number in the build environment; establish the at least one correspondence based on each node, and a unique product name and a unique version number generated by the node in the build environment; and generate the node state table based on the at least one correspondence and the state of each node.

In an embodiment, a first node is configured to build an installation package of a first product in a first environment, and the target node is one of first nodes. The processing unit 702 is further configured to: after the sending unit sends the request message to the target node, mark a state of the target node as "busy" in the node state table; detect whether a quantity of idle-state first nodes in the node state table is less than a first threshold; and if the quantity of idle-state first nodes in the node state table is less than the first threshold, configure and increase the quantity of first nodes, so that an increased quantity of first nodes is not less than the first threshold.

In an embodiment, the processing unit 702 is further configured to: when the target node completes a build task for the request message, mark the state of the target node as "idle", and update the node state table; and if the quantity of idle-state first nodes in the node state table exceeds a second threshold, decrease the quantity of first nodes, so that a decreased quantity of first nodes does not exceed the second threshold.

In addition, the processing unit 702 is further configured to delete a node in an offline state from the node state table.

In an embodiment, when the apparatus is used as a container editor, the processing unit 702 is further configured to detect a state of each node in a resource pool, where the state includes an online state and an offline state; and mark the online state or the offline state for each node.

In an embodiment, when the apparatus is configured to generate BIC, the receiving unit 701 is configured to obtain an external environment parameter. The external environment parameter includes: a programming language type and version, a software development kit SDK and version, and a product source code repository. The processing unit 702 is configured to generate the BIC based on the external environment parameter, and store the BIC in a BIC code repository.

In addition, the BIC includes product pipeline code and running environment code. Further, the processing unit 702 is further configured to execute the running environment code in the BIC to obtain an image file in the running environment. The image file is used to generate one or more nodes. When executing the product pipeline code in the BIC, the processing unit 702 needs to first obtain source code corresponding to a product, and generate a binary package of the product after executing the product pipeline code based on the source code corresponding to the product. The binary package may include a binary product installation package or a binary application package.

Figure 8:
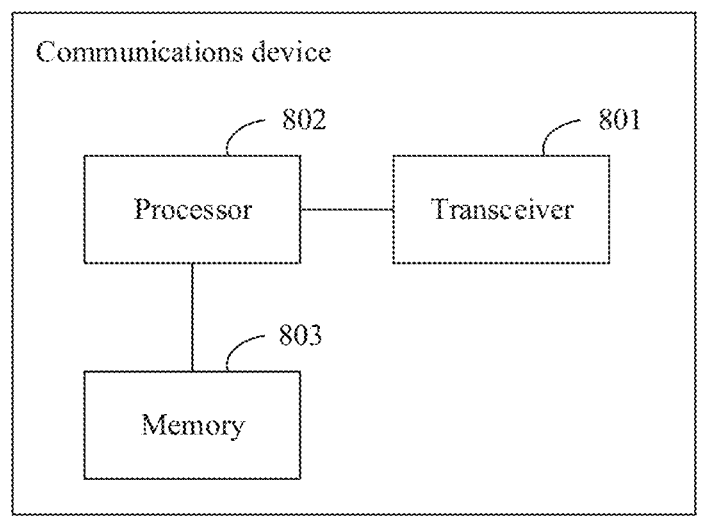
FIG. 8 is a schematic diagram of a structure of a communications device according to an embodiment of this application.

FIG. 8 is a schematic diagram of a structure of a communications device according to an embodiment of this application. The communications device may be the server or the communications apparatus in the foregoing embodiments, or may be a component (for example, a chip) that can be used for the server or the communications apparatus. The communications device may implement functions or operations of the server in the foregoing embodiments.

As shown in FIG. 8, the communications device may include a transceiver 801 and a processor 802, and may further include a memory 803. The memory 803 may be configured to store code or data. The transceiver 801 may include components such as a receiver, a transmitter, and an antenna. The communications device may further include more or fewer components, or combine some components, or have different component arrangements. This is not limited in this application.

The processor 802 is a control center of the communications device, and is connected to each part of the entire communications device through various interfaces and lines. The processor 802 runs or executes a software program or a module stored in the memory 803, and invokes data stored in the memory 803, to perform various functions of the communications device or process data.

The processor 802 may include an integrated circuit (integrated circuit, IC), for example, may include a single encapsulated IC, or may include a plurality of connected encapsulated ICs that have same or different functions. For example, the processor 802 may include only a central processing unit (central processing unit, CPU), or may be a combination of a GPU, a digital signal processor (digital signal processor, DSP), and a control chip (for example, a baseband chip) in a transceiver module. In various implementations of this application, the CPU may be a single computing core, or may include a plurality of computing cores.

In an embodiment, the processor 802 includes a processing chip. The processing chip may include one or more random access storage units, and the storage unit may be configured to store instructions or computer programs.

The transceiver 801 is configured to establish a communications channel, so that the communications device is connected to a communications network through the communications channel, to implement communication transmission between the communications device and another device. The transceiver 801 may be a module that completes receiving and sending functions. For example, the transceiver 801 may include communications modules such as a wireless local area network (WLAN) module, a Bluetooth module, and a baseband module, and a radio frequency (RF) circuit corresponding to the communications device. The transceiver 801 is configured to perform communication in a wireless local area network, Bluetooth communication, infrared communication, and/or communication in a cellular communications system, for example, wideband code division multiple access (WCDMA) and/or high speed downlink packet access (HSDPA). The transceiver 801 is configured to control communication between components in the communications device, and may support direct memory access (direct memory access).

In different implementations of this application, transceiver modules in the transceiver 801 are usually presented in a form of an integrated circuit chip, and may be selectively combined, without requiring that all the transceiver modules and corresponding antenna groups are included. For example, the transceiver 801 may include only a baseband chip, a radio frequency chip, and a corresponding antenna, to provide a communication function in a cellular communications system. The communications apparatus may be connected to a cellular network (or the internet through communication connection, for example, wireless local area network access or WCDMA access, that is established by the transceiver.

The memory 803 may include a volatile memory, for example, a random access memory (RAM), or may include a non-volatile memory, for example, a flash memory, a hard disk drive (HDD), or a solid-state drive (SSD). Alternatively, the memory 803 may include a combination of the foregoing types of memories. The memory may store programs, code, or data, and the processor 802 in the communications device may implement a function of the communications apparatus by executing the programs or the code.

In this embodiment of this application, the processor 802 and the transceiver 801 may be separately or coupled to implement all or some of the operations of the node determining method and the node state configuration in the foregoing method embodiments. For example, when the communications device is used as the server in the foregoing embodiment, the transceiver 801 may receive a request message. The request message is used to request to provide an installation package of a product required by a user, and the request message carries product information that uniquely identifies the product required by the user. The processor 802 searches, based on the product information in the request message, a node state table for a target node corresponding to the product information. The node state table includes at least one correspondence. Each correspondence is a relationship between one node and one piece of product information. A state of each node in the node state table is idle. Finally, the transceiver 801 sends the request message to the target node, so that the target node builds the corresponding product installation package for the product required by the user.

Further, functions to be implemented by the receiving unit 701 and the sending unit 703 in FIG. 7 may be implemented by the transceiver 801 in the communications device, or may be implemented by the transceiver 801 controlled by the processor 802, and a function to be implemented by the processing unit 702 may be implemented by the processor 802.

In addition, this application further provides a computer storage medium. The computer storage medium may store programs. When the programs are executed, some or all of the operations of the embodiments of the message sending method and the message receiving method provided in this application may be included. The storage medium may be a magnetic disk, an optical disc, a read-only memory (ROM), a random access memory (RAM), or the like.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions, for example, switching instructions. When the computer programs are loaded and executed on a computer, all or some of the procedures or functions are generated according to the embodiments of this application. The computer may be a general-purpose computer, a dedicated computer, a computer network, or other programmable apparatuses.

The computer instructions may be stored in a computer-readable storage medium or may be transmitted from a computer-readable storage medium to another computer-readable storage medium. For example, the computer instructions may be transmitted from one network node, computer, server, or data center to another website, computer, or server in a wired or wireless manner.

The computer-readable storage medium may be any usable medium accessible by a computer, or a storage device, such as a server or a data center, integrating one or more usable media. The usable medium may be a magnetic medium, for example, a floppy disk, a hard disk, or a magnetic tape, an optical medium (for example, a DVD), or a semiconductor medium, for example, a solid-state drive SSD.

In the specification, claims, and accompanying drawings of this application, the terms "first", "second", and the like are intended to distinguish between similar objects but do not necessarily indicate a specific order or sequence. It should be understood that the data termed in such a way are interchangeable in appropriate circumstances, so that the embodiments described herein can be implemented in other orders than the order illustrated or described herein. Moreover, the terms "include", "contain" and any other variants mean to cover the non-exclusive inclusion, for example, a process, method, system, product, or device that includes a list of operations or units is not necessarily limited to those operations or units, but may include other operations or units not expressly listed or inherent to such a process, method, product, or device.

A person skilled in the art may clearly understand that, the technologies in the embodiments of this application may be implemented by software in addition to a necessary general hardware platform. Based on such an understanding, the technical solutions of the embodiments of this application essentially or the part contributing to the conventional technology may be implemented in a form of a software product. The computer software product may be stored in a storage medium, such as a ROM/RAM, a magnetic disk, an optical disc and the like, and includes several instructions for instructing a computer device (which may be a personal computer, a server, or a network device and the like) to perform the methods described in the embodiments or some parts of the embodiments of the present application.

For same or similar parts in the embodiments in this specification, refer to each other. Especially, a network device/node or an apparatus device is basically similar to a method embodiment, and therefore is described briefly. For related parts, refer to the descriptions of the method embodiments.

The foregoing descriptions are implementations of this application, but are not intended to limit the protection scope of this application.

What is claimed is:

1. A node selection method, comprising:
   receiving a request message to request to provide an installation package of a product required by a user, wherein the request message includes product information that uniquely identifies the product required by the user;
   searching, in a node state table for a target node based on the product information, wherein the node state table comprises at least one correspondence, each correspondence representing a relationship between one node and one piece of product information, and a state of each node in the node state table is idle; and
   sending the request message to the target node, so that the target node builds a corresponding product installation package for the product required by the user;
   wherein before the receiving the request message, the method further comprises:
   receiving a configuration parameter entered by the user, wherein the configuration parameter is used to configure at least one build environment required when the user expects to build the product,
   generating at least one piece of build environment code based on the configuration parameter, and running each piece of the build environment code to obtain an image file corresponding to the piece of build environment code,
   generating at least one node based on the image file, wherein each node serves a build environment corresponding to one image file, and generating a unique product name and a unique version number in the build environment,
   establishing the at least one correspondence based on each node, and the unique product name and the unique version number generated by the each node in the build environment, and
   generating the node state table based on the at least one correspondence and the state of each node.

2. The method according to claim 1, wherein the product information comprises a product name and a version number corresponding to the product name; and
   the searching in a node state table for a target node based on the product information comprises:
   searching in the node state table for product information with the same product name and the same version number, and using the product information as target product information; and
   determining the target node corresponding to the target product information.

3. The method according to claim 1, further comprising:
   marking a state of the target node as "busy" in the node state table after the sending the request message to the target node;
   detecting whether a quantity of idle-state nodes in the node state table is less than a first threshold; and
   if the quantity of idle-state nodes in the node state table is less than the first threshold, configuring and increasing the quantity of the nodes, so that an increased quantity of the nodes is not less than the first threshold.

4. The method according to claim 3, further comprising:
   when the target node completes a build task for the request message, marking the state of the target node as "idle", and updating the node state table; and
   if the quantity of idle-state nodes in the node state table exceeds a second threshold, decreasing the quantity of the nodes, so that a decreased quantity of the nodes does not exceed the second threshold.

5. The method according to claim 1, wherein the request message is one of a plurality of request messages, the method further comprises:
   for each of the plurality of request messages, searching in the node state table for a target node corresponding to product information carried in each of the request messages, to obtain a plurality of target nodes; and
   sending the plurality of request messages to the corresponding target nodes.

6. A node selection apparatus, comprising:
   a processor; and
   a memory coupled to the processor to store instructions, which when executed by the processor, cause the processor to:
   receive a request message to request to provide an installation package of a product required by a user, and the request message includes product information that uniquely identifies the product required by the user;
   search in a node state table for a target node based on the product information, wherein the node state table comprises at least one correspondence, each correspondence represents a relationship between one node and one piece of product information, and a state of each node in the node state table is idle; and
   send the request message to the target node, so that the target node builds a corresponding product installation package for the product required by the user;

wherein the processor is further configured to:
before receiving the request message, receive a configuration parameter entered by the user, wherein the configuration parameter is used to configure at least one build environment required when the user expects to build the product,
generate at least one piece of build environment code based on the configuration parameter, and run each piece of the build environment code to obtain an image file corresponding to the piece of the build environment code,
generate at least one node based on the image file, wherein each node serves a build environment corresponding to one image file, and generate a unique product name and a unique version number in the build environment,
establish the at least one correspondence based on each node, and the unique product name and the unique version number generated by the each node in the build environment, and
generate the node state table based on the at least one correspondence and the state of each node.

7. The apparatus according to claim 6, wherein the product information comprises a product name and a version number corresponding to the product name; and
the processor is configured to:
search in the node state table for product information with the same product name and the same version number, and use the product information as target product information; and
determine the target node based on the target product information and a correspondence of the target product information.

8. The apparatus according to claim 6, wherein the processor is further configured to:
after sending the request message to the target node, mark a state of the target node as "busy" in the node state table;
detect whether a quantity of idle-state nodes in the node state table is less than a first threshold; and
if the quantity of idle-state nodes in the node state table is less than the first threshold, configure and increase the quantity of the nodes, so that an increased quantity of the nodes is not less than the first threshold.

9. The apparatus according to claim 8, wherein the processor is further configured to:
when the target node completes a build task for the request message, mark the state of the target node as "idle", and update the node state table; and
if the quantity of idle-state nodes in the node state table exceeds a second threshold, decrease the quantity of the nodes, so that a decreased quantity of the nodes does not exceed the second threshold.

10. The apparatus according to claim 6, wherein the request message is one of a plurality of request messages, the processor is configured to:
search in the node state table for a target node corresponding to product information carried in each of the plurality of request messages, to obtain a plurality of target nodes; and
send the plurality of request messages to the corresponding target nodes.

11. A non-transitory computer-readable medium having instructions stored therein, which when executed by a processor, cause the processor to perform operations, the operations comprising:

receiving a request message to request to provide an installation package of a product required by a user, wherein the request message includes product information that uniquely identifies the product required by the user;
searching, in a node state table for a target node based on the product information, wherein the node state table comprises at least one correspondence, each correspondence representing a relationship between one node and one piece of product information, and a state of each node in the node state table is idle; and
sending the request message to the target node, so that the target node builds the corresponding product installation package for the product required by the user;
wherein before the receiving a request message, the operations further comprise:
receiving a configuration parameter entered by the user, wherein the configuration parameter is used to configure at least one build environment required when the user expects to build the product,
generating at least one piece of build environment code based on the configuration parameter, and running each piece of the build environment code to obtain an image file corresponding to the piece of build environment code,
generating at least one node based on the image file, wherein each node serves a build environment corresponding to one image file, and generating a unique product name and a unique version number in the build environment,
establishing the at least one correspondence based on each node, and the unique product name and the unique version number generated by the each node in the build environment, and
generating the node state table based on the at least one correspondence and the state of each node.

12. The computer-readable medium according to claim 11, wherein the product information comprises a product name and a version number corresponding to the product name,
the searching in a node state table for a target node based on the product information comprises:
searching in the node state table for product information with the same product name and the same version number, and using the product information as target product information; and
determining the target node corresponding to the target product information.

13. The computer-readable medium according to claim 11, wherein the operations further comprise:
marking a state of the target node as "busy" in the node state table after the sending the request message to the target node;
detecting whether a quantity of idle-state nodes in the node state table is less than a first threshold; and
if the quantity of idle-state nodes in the node state table is less than the first threshold, configuring and increasing the quantity of the nodes, so that an increased quantity of the nodes is not less than the first threshold.

14. The computer-readable medium according to claim 13, wherein the operations further comprise:
when the target node completes a build task for the request message, marking the state of the target node as "idle", and updating the node state table; and
if the quantity of idle-state nodes in the node state table exceeds a second threshold, decreasing the quantity of the nodes, so that a decreased quantity of the nodes does not exceed the second threshold.

15. The computer-readable medium according to claim 11, wherein the request message is one of a plurality of request messages, wherein the operations further comprise:
for each of the plurality of request messages, searching in the node state table for a target node corresponding to product information carried in each of the request messages, to obtain a plurality of target nodes; and
sending the plurality of request messages to the corresponding target nodes.

* * * * *